United States Patent

Ishikawa

[11] Patent Number: 5,339,226
[45] Date of Patent: Aug. 16, 1994

[54] PROJECTION HEAD LAMP FOR CARS

[75] Inventor: Masaaki Ishikawa, Shizuoka, Japan

[73] Assignee: Koito Manufacturing Co., Ltd., Tokyo, Japan

[21] Appl. No.: 69,358

[22] Filed: Jun. 1, 1993

[30] Foreign Application Priority Data

Jun. 3, 1992 [JP] Japan .................. 4-142361

[51] Int. Cl.⁵ .................. B60Q 1/02; B60Q 1/04
[52] U.S. Cl. .................. 362/61; 362/282; 362/319; 362/351
[58] Field of Search .................. 362/61, 66, 80, 277, 362/282, 284, 319, 321, 322, 324, 351

[56] References Cited

U.S. PATENT DOCUMENTS

| | | | |
|---|---|---|---|
| 2,015,935 | 10/1935 | Herring | 362/284 |
| 4,967,319 | 10/1990 | Seko | 362/61 |
| 5,060,120 | 10/1991 | Kobayashi et al. | 362/282 |
| 5,068,768 | 11/1991 | Kobayashi | 362/319 |
| 5,138,540 | 8/1992 | Kobayashi et al. | 362/277 |
| 5,158,352 | 10/1992 | Ikegami et al. | 362/284 |

Primary Examiner—Ira S. Lazarus
Assistant Examiner—Y. Quach
Attorney, Agent, or Firm—Sughrue, Mion, Zinn, Macpeak & Seas

[57] ABSTRACT

A projection head lamp for vehicles comprises a substantially elliptical reflector 14, a light source located at the first focal point of the reflector 14, a projection lens 16 disposed in front of the reflector 14, and a shade 20 located at a position near to the second focal point and the focal point of the projection lens 16, the shade 20 intercepting light beams going from the reflector 14 toward the projection lens 16. The shade 20 may be turned about the horizontal shaft. To adjust the beam distribution pattern, the shade 20 is turned. The shade 20 consists of left and right shades 21 and 22, which are separated and horizontally extended when seen from the point right under the optical axis. The shades 21 and 22 have pairs of shade plates 212 and 213, and 222 and 223, of which the extended parts extending along the horizontal shaft overlap with one another.

8 Claims, 4 Drawing Sheets

PROJECTION HEAD LAMP FOR CARS

BACKGROUND OF THE INVENTION

The present invention relates to a projection head lamp of the type in which light beams reflected by a substantially elliptical reflector are projected forward by a projection lens. More particularly, the invention relates to a projection head lamp for vehicles capable of selectively changing a beam distribution pattern from one pattern to another by turning a shade with a blade-like shade plate.

An example of this type of head lamp is disclosed in Unexamined Japanese Utility Model Application (OPI) No. Sho. 63-41801, for example. The disclosed head lamp is constructed as shown in FIG. 1. As shown, a light source 3 is positioned at the first focal point F1 of a reflector 2 shaped substantially elliptical, and a shade 4 is positioned at the second focal point F2. The shade 4 is constructed with a body 8 including gears, and a shade plate 9 extended outward from the body 8. In the head lamp thus constructed, for selectively changing a beam distribution pattern from one beam pattern to another, the shade 4 is turned about a horizontal support shaft O, to shade part of light beams directed toward a projection lens 5. Reference numeral 1 designates a lamp body, and numeral 6, a front lens.

Another head lamp of this type has been proposed. The shade structure of the head lamp contains a plural number of shade plates 9, as shown in FIG. 2. However, this proposal suffers from the following disadvantages.

In the head lamp having such a shade structure, to change a beam distribution pattern, a shade 4 is turned. During the process of turning the shade 4, the position of the top end of the shade plate 9 is remarkably lowered. As a result, a state that the top end of the shade plate 9 is not in a predetermined position (near to the second focal point F2) occurs for an instant. At this time, the beam distribution pattern resembles the main beam distribution pattern. The head lamp gives a glare to the driver in the vehicle running in the opposite direction. The driver in the forerunning vehicle mistakenly recognizes light of that beam pattern as the sign of passing.

SUMMARY OF THE INVENTION

In view of the foregoing drawbacks accompanying the conventional headlamp, it is an object of the present invention to provide a projection head lamp for vehicles which is capable of shading light beams as intended when the beam distribution pattern is changed.

The above and other objects can be achieved by a provision of a headlamp which, according to the present invention, includes a substantially elliptical reflector, a light source located at the first focal point of the reflector, a projection lens disposed in front of the reflector, and a shade located at a position near to the second focal point and the focal point of the projection lens, the shade intercepting light beams going from the reflector toward the projection lens, and the shade being allowed to turn about the horizontal shaft to adjust the beam distribution pattern, wherein the shade includes right and left shades, which are separated and horizontally extended when seen from the point right under the optical axis, and are allowed to turn about the horizontal shaft, and the shades and have pairs of blade-like shade plates, of which the extended parts extending along the horizontal shaft overlap with one another.

In the head lamp thus constructed, the shade includes right and left shades, which are separated and horizontally extended when seen from the point right under the optical axis of he reflector, and are allowed to turn about the horizontal shaft, and the shades have pairs of blade-like shade plates, of which the extended parts extending along the horizontal shaft overlap with one another. Accordingly, when the beam distribution pattern is changed by turning one of the left and right shades, the extended part of the other shade is present at the light intercepting position, thereby intercepting the light beams directed toward the projection lens.

Since the extended parts extending along the horizontal shaft overlap with one another, various types of beam distribution patterns can be formed by properly combining the shade plates.

DESCRIPTION OF THE PREFERRED EMBODIMENTS

The preferred embodiment of the present invention will be described with reference to the accompanying drawings.

Figure 1:
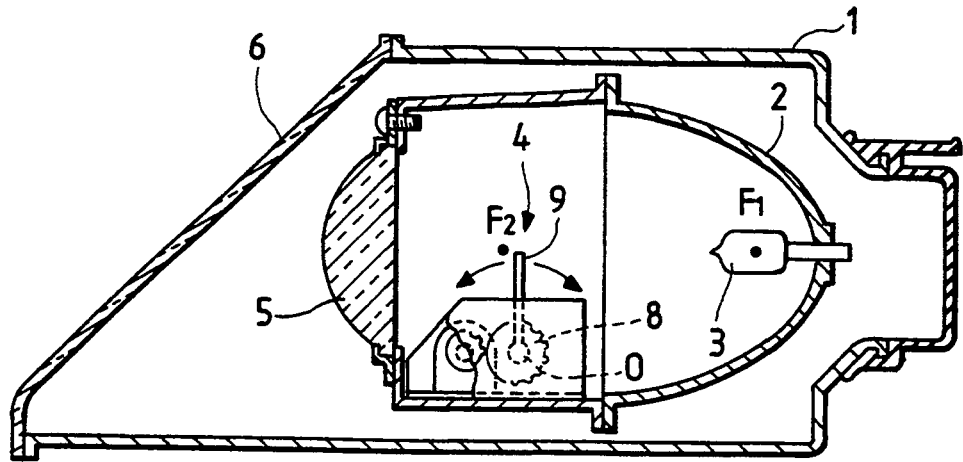
FIG. 1 is a longitudinal sectional view showing a conventional projection head lamp for vehicles.
Figure 2:
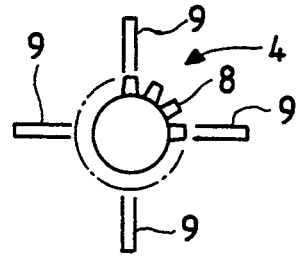
FIG. 2 is a view showing another conventional projection head lamp for vehicles.
Figure 4:
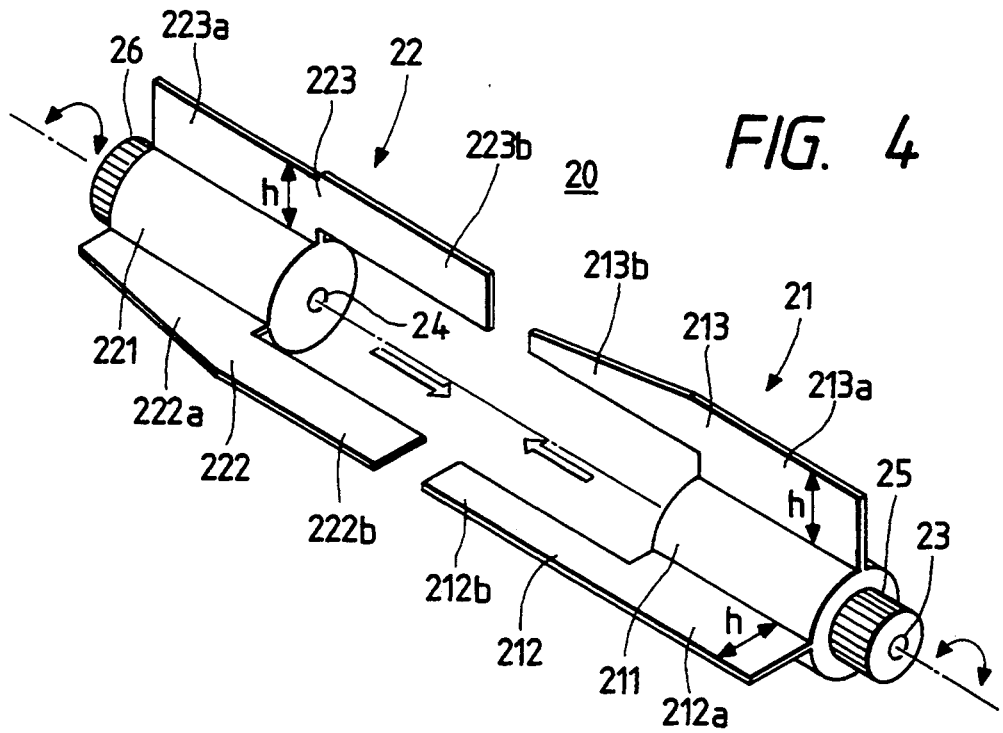
FIG. 4 is an exploded perspective view showing the shade in the head lamp of FIG. 3.
Figure 3:
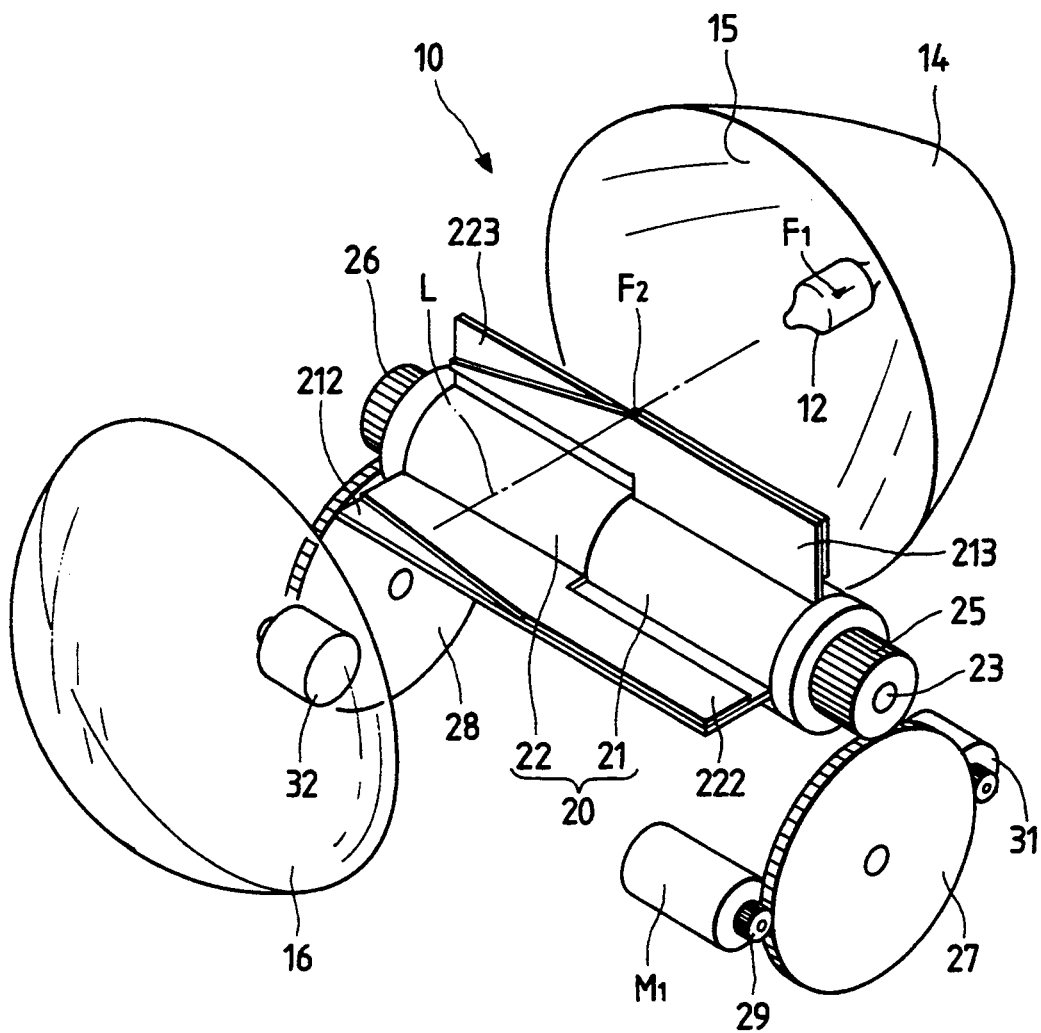
FIG. 3 is an exploded view showing the internal structure of a projection head lamp for vehicles according to an embodiment of the present invention.

In FIGS. 3 to 5, FIG. 3 is an exploded view showing the internal structure of a projection head lamp for vehicles according to an embodiment of the present invention. FIG. 4 is a perspective view showing the shade when seen from the projection lens side. FIGS. 5A to 5F show a set of diagrams showing how a beam distribution pattern is formed when viewed from the reflector side.

In those figures, a projection unit 10, supported by an aiming mechanism (not shown), is contained in a lamp body shaped like a capsule (also not shown). The projection unit 10 is tiltable about the horizontal shaft and the vertical shaft (not shown) by the aiming mechanism. The aiming direction of the light beams projected from the projection unit 10, i.e., the projection axis (optical axis) L of the head lamp, can be tilted back and forth as well as to the left and right through the aiming mechanism.

The projection unit 10 includes a substantially elliptical reflector 14 into which is inserted a discharge bulb 12 and a projection lens 16 located in front of the reflector 14, the reflector 14 and the projection lens 16 being firmly coupled together into a one-piece construction. The projection lens 16 is supported by a lens holder (not shown) fastened to the reflector 14 by means of screws.

An elliptical reflecting surface 15 having first and second focal points F1 and F2 (this technique is well known) is formed on the inner side of the reflector 14. A discharge part of a discharge bulb 12 is located at the first focal point F1. A shade 20 is located at the focal position of the projection lens 16, near to the second focal point F2. The shade 20 shades part of the light beams which are reflected by the reflector 14 and go to the projection lens 16, thereby forming a clear cut line. The light beams emitted from the discharge bulb 12 are reflected by the reflecting surface 15 and guided forward, and arranged into substantially parallel light beams by the projection lens 16.

As illustrated in FIGS. 3 and 4, the shade 20 includes a left (as seen from the reflector side) shade 21 and a right (as seen from the reflector side) shade 22. The right and left shades are separated and horizontally extended when seen from the point right under the optical axis L. The shades 21 and 22 are rotatably supported by horizontal support shafts 23 and 24.

Gears 25 and 26 are fastened to the external ends of the horizontal support shafts 23 and 24 of the shades 21 and 22, respectively. The gears 25 and 26 are respectively in mesh with drive gears 29 and 30 coupled with the output shafts of motors M1 and M2, with intermediate gears 27 and 28 intervening therebetween. The motor M2 and the drive gear 30 for the right shade 22 are provided on the rear side of the right shade 22 (not illustrated).

Angle detectors 31 and 32, such as encoders, for detecting turn angles of the shades 21 and 22, are in mesh with intermediate gears 27 and 28, respectively. When the motors M1 and M2 are driven, the shades 21 and 22 are turned independently.

The structure of the left and right shades 21 and 22 will be described in detail with reference to FIG. 4. The left shade 21 is formed of a tubular body 211, and first and second shade plates 212 and 213, which are extended in the directions different by 90°, from the outer circumferential surface of the body 211. The right shade 22 is formed of a tubular body 221, and first and-second shade plates 222 and 223, which are extended in the direction different by 90°, from the outer circumferential surface of the body 221.

The shade plate 212 includes a base part 212a lying on the body 211, and an extended part 212b extending from the base part 212a along the horizontal support shaft 23. The remaining shade plates 213, 222, and 223 likewise include base parts 213a, 222a, and 223a, and extended parts 213b, 222b, and 223b, respectively, as shown. In the left shade 21, the base parts 212a and 213a of the shade plates 212 and 213 have the same height h. The extended part 212b is extended along the horizontal shaft, while keeping the height h. The upper edge of the extended part 213b is tapered downward at an angle 15°, with the height h as the highest point.

Also in the right shade 22, the base part 223a of the shade plate 223 has the height h. The upper edge of the base part 222a is tapered downward at an angle 15°, with the height h as the highest point. The extended part 222b of the shade plate 222 is extended along the horizontal shaft, while keeping the height h. The upper edge of the extended part 223b is tapered upward at 45° from the height h, and horizontally extended along the horizontal shaft at a height, which is slightly higher than the height h.

To assemble, the left shade 21 with the shade plates 212 and 213 and the right shade 22 with the shade plates 222 and 223 are moved in the directions of arrows, to be coaxially coupled with each other. In the resultant assembly, the extended parts of one shade hold the base part of the other shade, and vice versa.

Figure 7A:
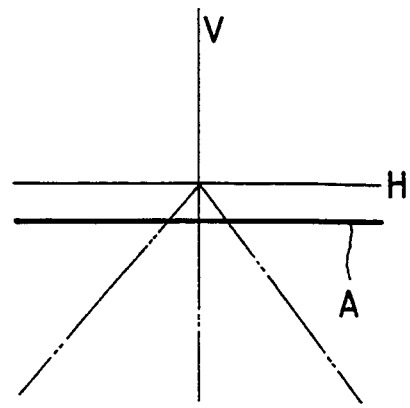
FIGS. 7A to 7C show diagrams for explaining the clear cut lines of a beam distribution pattern formed by the head lamp.
Figure 6B:
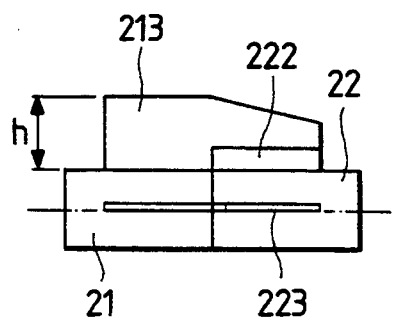
Figure 7B:
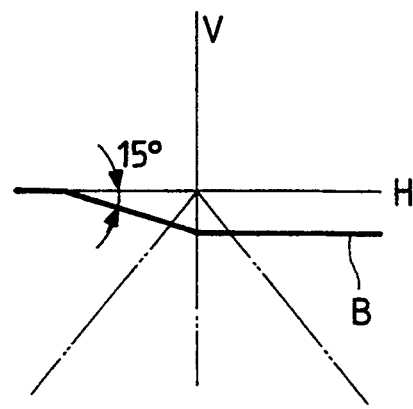
Figure 7C:
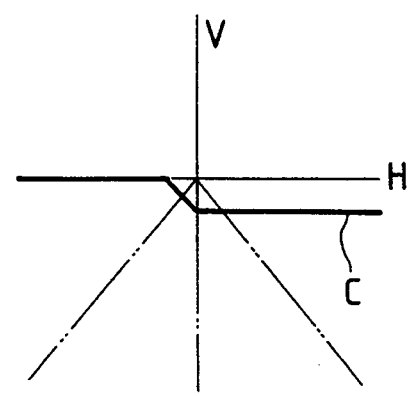

When the motors M1 and M2 are driven, three beam distribution patterns as shown in FIGS. 7A to 7C are obtained in the head lamp of this embodiment. The beam distribution pattern of FIG. 7A is used when a vehicle runs past another vehicle in the street. In this pattern, a substantially horizontal clear cut line A is formed at a point 50 m ahead of the vehicle on the road side.

Figure 5A:
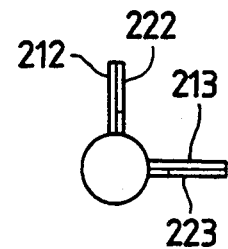
FIGS. 5A to 5F show a set of diagrams showing how the shade in the FIG. 4 head lamp is turned.
Figure 5B:
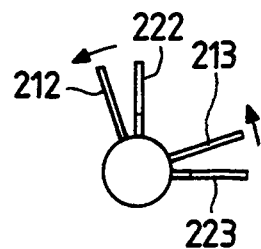
Figure 5C:
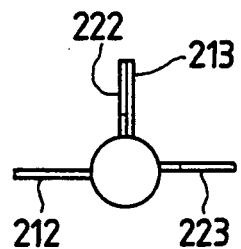
Figure 5D:
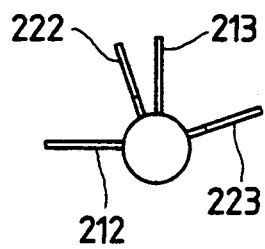
Figure 5E:
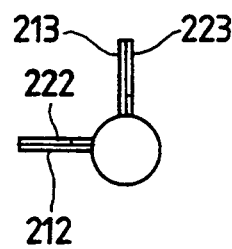
Figure 5F:
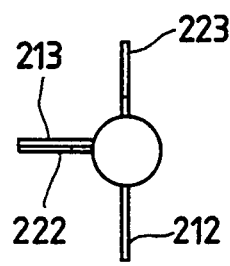
Figure 6A:
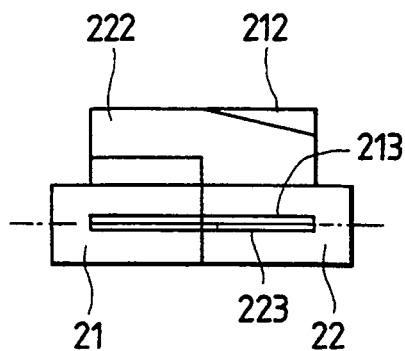
FIGS. 6A to 6C show a set of diagrams showing the shade when seen from the reflector side.

To form the beam distribution pattern containing the clear cut line A, the shades 21 and 22 are positioned as shown in FIGS. 5A and 6A. The diagrams of FIGS. 5A to 5F show the shades 21 and 22 when seen from the right side.

In the state of FIG. 5A, the shade plates 212 and 213 of the left shade 21 does not reach the shade plates 222 and 223 of the right shade 22 when viewed in the turning direction (counterclockwise) of the shade plates 222 and 223. The first shade plate 212 of the left shade 21 and the first shade plate 222 of the right shade 22 overlap. In this case, the base part 222a (tapered at 15°) of the right shade 22 is shaded by the extended part 212b (horizontally extending at the height h) of the shade plate 212. Accordingly, the shade 20 takes the shape horizontally extending at the height h. The shade 20 thus shaped shades part of the light beams going from the reflector 14 toward the projection lens 16, thereby forming the clear cut line A of FIG. 7A.

Then, the motor M1 is driven to turn the left shade 21 by 90° in the direction of arrows, from the position of FIG. 5A to the position of FIG. 5C. In this state of FIG. 5C, the first shade plate 222 of the right shade 22 and the second shade plate 213 of the left shade 21 overlap. The 15° tapered base part 222a of the first shade plate 222 coincides with the extended part 213b of the second shade plate 213. Accordingly, the upper edge of the shade 20 is contoured such that the left half part of the upper edge horizontally extends at the height h, while the right half part is declined at 15° from the height of h. The resultant cut line is the clear cut line B shown in FIG. 7B.

In this embodiment, when the left shade 21 is turned by driving the motor M1, the right shade 22 is left as it is. In this state, the first shade plate 222 of the right shade 22 is present at the position to intercept the light beams going from the reflector 14 toward the projection lens 16. Accordingly, the light beams which have been shaded by the left shade 21 before the shade is turned, can be shaded by the extended part 222b of the first shade plate 222. As a result, the problem of glare and pseudo passing will not be created.

Then, the motor M2 is driven to turn the right shade 22 by 90° (FIG. 5E), and the motor M1 is driven to turn the left shade 21 by 90°, to set up a state of FIG. 5F where only the shade plate 223 of the right shade 22 is present at the position to intercept the light beams going from the reflector 14 toward the projection lens 16.

Figure 6C:
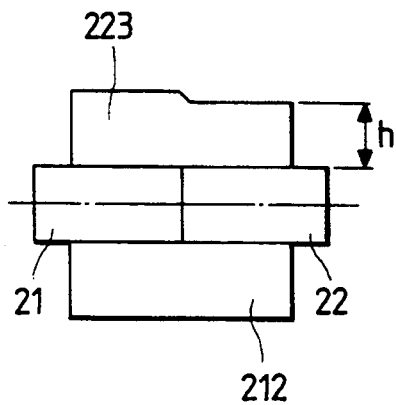

The contour of the upper edge of the shade 20 in this state is such that, as shown in FIG. 6C, the right half part of the upper edge is parallel to the horizontal shaft at the height h, while the left half part is stepped up at 45° from the height of h, and then extends horizontally. As a result, the clear cut line C shown in FIG. 7C is formed.

Thus, when the beam distribution pattern is changed by turning one of the left and right shades 21 and 22, the extended part 213b or 223b of the other shade 21 or 22 is present at the light intercepting position. The glare and passing problem will not arise.

In the embodiment as mentioned above, the shades 21 and 22 have the pairs of shade plates 212 and 213, and 222 and 223, respectively. Each pair of shade plates extend upward from the body in the directions different by 90°. If required, each shade may have three or more shade plates.

As seen from the foregoing description, a projection head lamp for vehicles according to the present invention is able to shade light beams as intended when the beam distribution pattern is changed. The head lamp gives no glare to the driver in the vehicle running in the opposite direction. The mistaken sign of passing will not be given to the driver in the forerunning vehicle. Further, when the shade plates are properly combined, various types of beam distribution patterns can be formed.

What is claimed is:

1. A projection type headlamp, comprising:
   a substantially oval reflector;
   a light source disposed at a first focal point of said reflector;
   a projection lens disposed in front of said reflector; and
   shade means for cutting at a predetermined position a part of light beam emitted from said light source and reflected by said reflector to form a desired light distribution pattern, said shade means being provided between said reflector and said projection lens in the vicinity of a second focal point of said reflector and substantially at a focus point of said projection lens, said shade means via motor and gear means rotating along a horizontal axis thereof which is perpendicular to an axis of said light source, said shade means comprising:
   a first shade member having at least two plates spaced apart from each other by a predetermined angle; and
   a second shade member having at least two plates spaced apart from each other by a predetermined angle,
   said blades of said first and second shade members successively positioning at said predetermined position during the rotation of said shade means, whereby said part of light beam reflected by said reflector always cutting generally by one of said plates.

2. The projection lamp of claim 1, wherein said first and second shade member rotate along said horizontal axis of said shade means independently from each other.

3. The projection lamp of claim 1, wherein each of said first and second shade member comprises a cylindrical body member having a center axis coincide with said horizontal axis of said shade means, and each of said plate comprises a pair of a base part and an extension part, said base parts protruding radially from said body member and each of said extension parts extending axially from each of said base parts.

4. The projection lamp of claim 3, wherein said extension parts of said first and second shade members overlap with said base parts of said second and first shade members respectively.

5. The projection lamp of claim 3, wherein said pair of base parts of each of said first and second shade members spaced apart from each other by an angle of 90°.

6. The projection lamp of claim 3, wherein at least one of said extension parts is inclined by 15° with respect to an outer edge of the base part from which said at least one of said extension part extends, and an outer edge of at least one other of said extension parts is stepped up by an angle of 45° with respect to another outer edge of the base part from which said at least one other of said extension part extends.

7. The projection lamp of claim 1, wherein said first and second shade members are arranged laterally along said horizontal axis of said shade means and adjacent to each other.

8. The projection lamp of claim 1, further comprising a first motor operatively engaging with said first shade member through gear means and a second motor operatively engaging with said second shade member through gear means.

* * * * *